F. D. Green,
Cutter Head.
N° 81,361.  Patented Aug. 25, 1868.

Witnesses.
Wm. A. Morgan
Wm. Dean Overell

Inventor:
F. D. Green
per Munn & Co
Attorney

UNITED STATES PATENT OFFICE.

F. D. GREEN, OF WILLIAMSPORT, PENNSYLVANIA, ASSIGNOR TO HIMSELF AND GEORGE ZIMMER & CO., OF THE SAME PLACE.

IMPROVEMENT IN MACHINES FOR CUTTING PANELS.

Specification forming part of Letters Patent No. 81,361, dated August 25, 1868.

*To all whom it may concern:*

Be it known that I, F. D. GREEN, of Williamsport, in the county of Lycoming and State of Pennsylvania, have invented a new and useful Improvement in Machine for Forming Raised Panels; and I do hereby declare that the following is a full, clear, and exact description thereof, which will enable those skilled in the art to make and use the same, reference being had to the accompanying drawings, forming part of this specification, in which—

Figure 1:
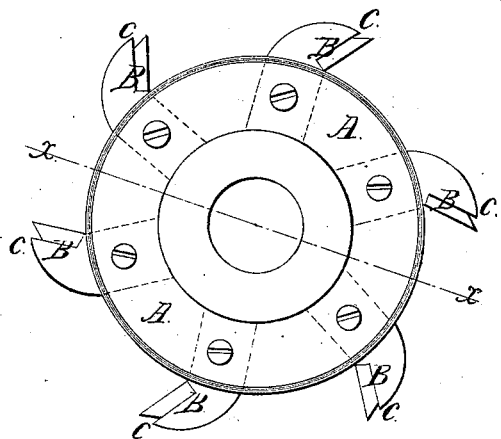
Figure 2:
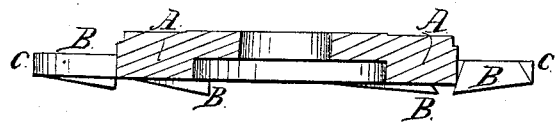

Figure 1 is a rear view of the cutter-head, showing the cutters or teeth attached thereto. Fig. 2 is a detail cross-section of the same, taken through the line $x\ x$, Fig. 1.

Similar letters of reference indicate corresponding parts.

My invention has for its object to furnish an improved machine for forming raised panels, so as to raise and finish a panel at one operation; and it consists in the construction of the cutters or teeth, as hereinafter more full described.

A is the cutter-head, which is attached to a shaft or mandrel in the ordinary manner, and to which motion is given by the ordinary means. B are the cutters or teeth, the shanks of which are secured in radial notches in the face or forward side of the cutter-head A, as shown in dotted lines in Fig. 1. The cutting part of the teeth B is inclined forward, and the cutting-edge is made overhanging, the end of said edge next the cutter-head A projecting most, so as to give the desired bevel to the panel.

The rear edges of the teeth are in a line with the face of the cutter-head A, to diminish the friction. Upon the outer end of the teeth B is formed a tooth, C, having a cutting-edge formed upon its outer end, for the purpose of cutting out the part of the panel marked by the point of the main or forward part of the cutter B, and leaving the edge or shoulder of the raised part of the panel square and finished.

I claim as new and desire to secure by Letters Patent—

The tooth or cutter B C, constructed and operating substantially as herein shown and described, in connection with the cutter-head A, as and for the purpose set forth.

F. D. GREEN.

Witnesses:
  GEO. A. CRAMER,
  N. E. KINGSBURY,
  SIMON YEAGER.